H. N. WAYNE.
FIBRILLOUS TIRE.
APPLICATION FILED NOV. 24, 1920.
1,428,571.
Patented Sept. 12, 1922.
2 SHEETS—SHEET 1.
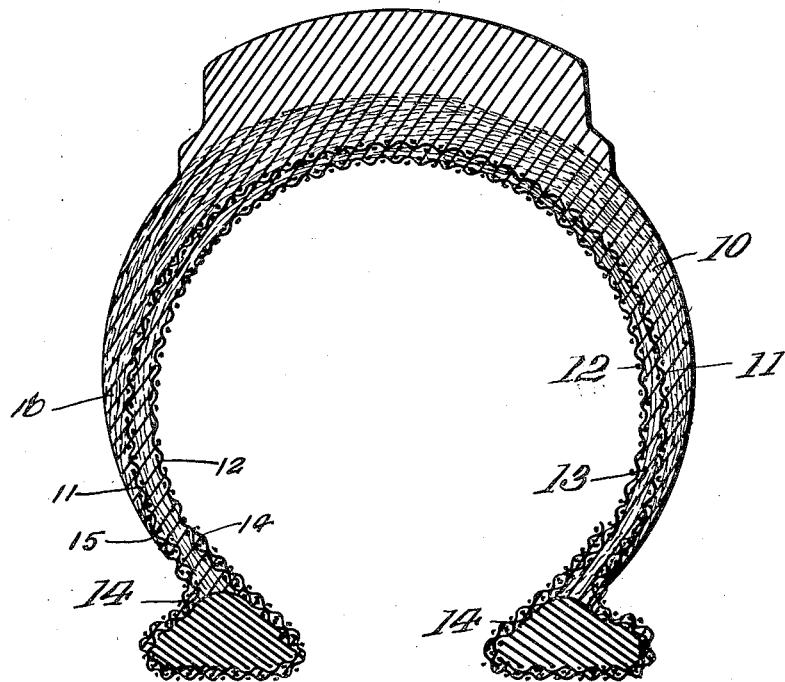
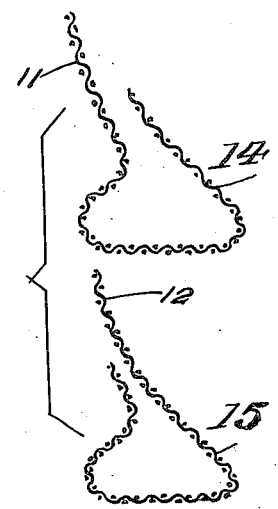
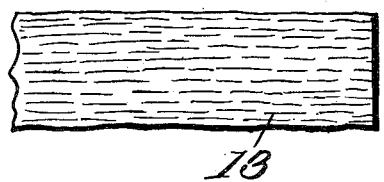
Inventor
H. N. Wayne
By
Attorney

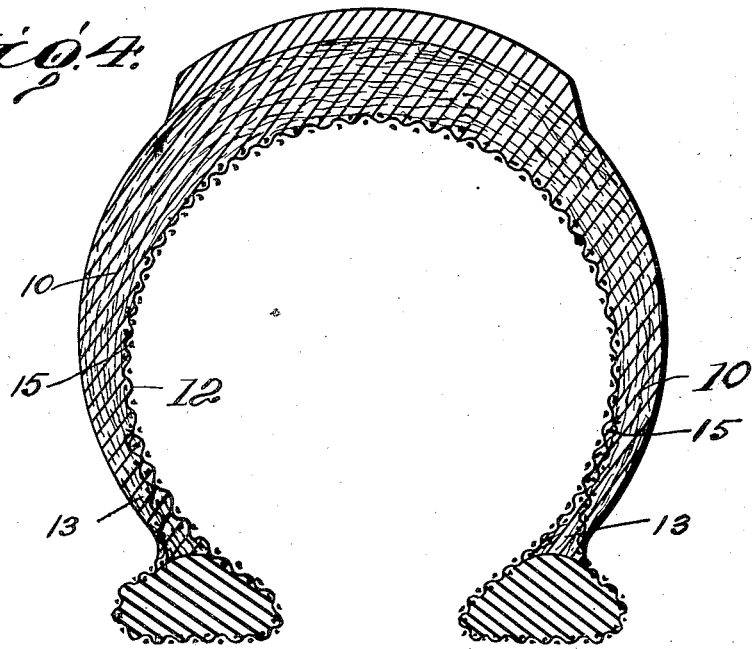
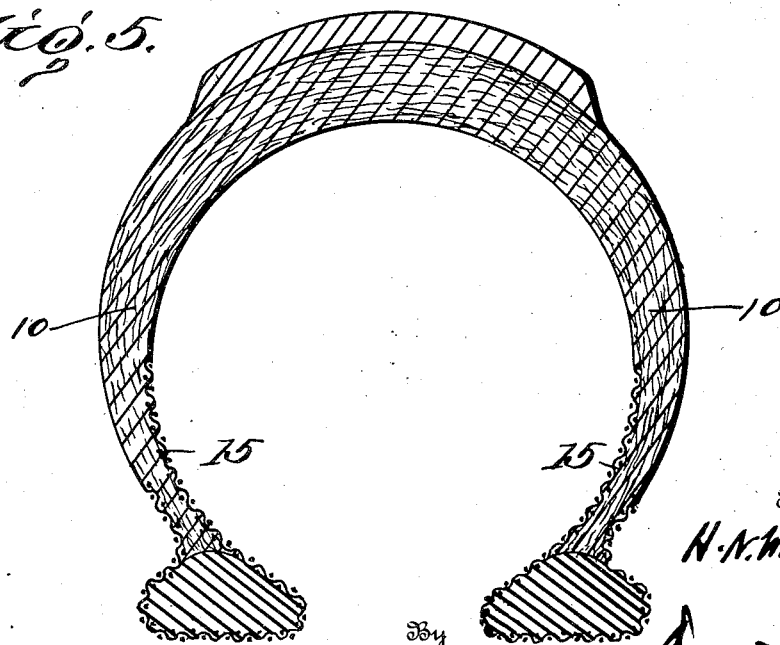

Patented Sept. 12, 1922.

1,428,571

UNITED STATES PATENT OFFICE.

HERBERT N. WAYNE, OF WASHINGTON, DISTRICT OF COLUMBIA.

FIBRILLOUS TIRE.

Application filed November 24, 1920. Serial No. 426,251.

*To all whom it may concern:*

Be it known that I, HERBERT N. WAYNE, a citizen of the United States, residing at Washington, in the District of Columbia, have invented certain new and useful Improvements in Fibrillous Tires; and I do hereby declare the following to be a full, clear, and exact description of the invention, such as will enable others skilled in the art to which it appertains to make and use the same.

This invention relates to pneumatic tires and particularly pertains to a puncture proof, resilient, economical construction thereof.

It is the principal object of this invention to provide a new and inexpensive means for reenforcing and strengthening the carcass structure; to provide a new method of carcass construction whereby the customary woven or cord fabric used may be in large, or wholly, replaced by more economical means without destroying the practical efficiency of the tire.

To this end the invention comprises the parts and combinations recited in the appended claims.

In the accompanying drawings:

Figure 1 is a vertical section of the preferred form of my invention.

Figure 2 presents detail views of lower portions of the plies of fabric where they overlap about the bead, and showing the termination of the pliers on the opposite sides.

Figure 3 is a detail illustrating what I term a mixed combination of fibre and rubber, and is, in fact, a plan detail of part of a sheet of the material.

Figures 4 and 5 are sectional views showing modified forms of side wall construction in the disposition of the fabric associated with the beads and body of the casing.

In these figures, 10 represents the customary body of a tire with the usual tread portion. 11 and 12 represent layers of fabric which in this case conform to the side walls of the tire and are slightly separated to leave a space within which is placed a combination of rubber and a fibrous material, 13, and which, in view of the fact that this material illustrated, for example, in Figure 3, is mixed by a mill, I have called mixed combination of rubber and fibrous material. 14 and 15 represent the bead-reenforcing portions of the fabric 11 and 12 at the bottom of the side wall and reenforcing the bead portion so that in the form illustrated in Figure 1 there will be added reenforcement by the terminal overlap, as clearly shown in Figure 2.

In Figure 4 I have illustrated a ply of fabric applied to the inner wall of the tire carcass and surrounding the bead portion and extending up into the main body portion to the adjacent opposite side of the inner fabric.

In Figure 5 I have shown a single ply in the form illustrated in Figure 2, that is, applied to the bottom portion of the tire carcass and surrounding the part. In both Figures 4 and 5 I have illustrated the body portion, excepting the tread, as composed of a mixed combination of rubber and fibrous material.

One form of my invention, that of Figures 4 and 5, is particularly adapted for the construction of casings for light cars, such as Fords, Maxwells, etc., and in their construction I may use fabric only for reenforcing the beads and side walls, or a single ply of fabric, and a reenforcing ply around the bead. With the exception of the beads, the fabric reenforcement and the tread, all of the carcass may be constructed of a fibrous compound material, preferably cotton in mixed combination with rubber.

Frictioned tire fabric, scrap or waste, when ground in a rubber mixing mill, forms a homogeneous mass of fibrous stock perfectly adapted for use in compounding the main body portion of my improved tire carcass.

Fibrous stock is well known and in common use for various purposes in mechanical rubber factories, but it has not heretofore been used, to the knowledge of applicant, for the construction of a pneumatic tire casing as a substitute for all or any part of the usual fabric body, or as a binding and reenforcing means between the layers or plies of ordinary tire fabric, either woven fabric or the so-called cord fabric, the fabric being previously "frictioned", that is, coated with rubber.

I have used with satisfactory results a compound for this general purpose consisting of as much as seventy-five percent of ground, uncured tire "friction" waste and twenty-five percent of new rubber and vulcanizing agents. When used, however, for binding and reenforcing means between the plies I prefer to increase the proportion of rubber and reduce the amount of fibrous material to insure the desired cushioning effect. When such a fibrous compound is calendered into thin sheets the fibers are drawn out in the general longitudinal direction of the sheet and when several such sheets are built up, laminated, one upon the other, the result is a composite sheet or slab of fiber and rubber having great tensile strength and resilient flexibility but non-elastic or non-extensible in the direction in which the fibers lie.

A tire casing having laminated layers of this fibrous compound laid with the longitudinal direction of the fibers extending in a general transverse direction around the cross-sectional circumference of the casing, —that is, extending in an upward direction from the bead line to the thread portion—, and having even one ply of tire fabric encircling the inner surface of the casing, will possess sufficient strength to carry a light car and can be constructed so cheaply as to materially reduce the expense of the tire equipment for such cars.

For heavier cars, or even for light cars doing heavy duty service, I prefer to use two or more plies of rubberized woven or cord fabric around the inner circumference of the casing and reenforced between the plies with fibrous compounded stock as shown in Figure 1, but in all cases it will be found entirely practical to reduce the number of plies of cord fabric found necessary in the construction of ordinary or other casings.

A tire casing of the character described can be manufactured much more economically than a casing constructed of five, six or seven plies of expensive tire fabric and will deliver to the user many more miles of tire service for a given amount of money invested.

Having described the composition, the method of construction and the function of my improved tire, what I claim is:—

1. A tire casing having the main portion of the carcass body composed of fibrous material and rubber ground together.

2. A tire casing having the main body portion composed of fibrous material intimately mixed with rubber and a fabric reenforcement extending around the beads and associated with the body portion of mixed fiber and rubber.

3. A tire casing, having a layer of fabric extending around the inner surface of the casing and encircling the beads; the outer main body portion composed of fibrous material intimately mixed with rubber, and the whole vulcanized together in a unitary structure.

4. A tire casing having the main body portion composed of fibrous material intimately mixed with rubber, and a plurality of plies of reenforcing fabric associated with the body portion of mixed fiber and rubber, and having at least one ply of which extending around the bead.

5. A tire casing having its main body portion composed of fibrous material intimately mixed with rubber; a layer of fabric extending completely around the circumferential portion of the casing, and a fabric reenforcement extending around the beads and associated with the side walls of the casing.

6. A tire casing partly consisting of plies of rubberized fabric having a body of fibrous material intimately mixed with rubber interlaid between the plies of fabric.

7. A tire casing having the main portion of its carcass body composed of fibrous material intimately mixed with rubber and with the fiber therein having a general common direction, the said composition being laid so that the lengthwise direction of the fibers will be around the carcass from the bead line toward the tread portion.

8. A tire casing partly consisting of plies of rubberized fabric and having a body of fibrous material intimately mixed with rubber interlaid between the plies of fabric, the mixed fibrous compound having the fibers extending in the same general lengthwise direction being laid so that the lengthwise direction of its fibers will be around the carcass from the bead line toward the tread portion.

In testimony whereof I affix my signature.

HERBERT N. WAYNE.